United States Patent
Moore et al.

[11] 3,856,714
[45] Dec. 24, 1974

[54] POLYVIOLOGENS

[75] Inventors: Phyllis T. Moore, Morgantown, W. Va.; Myron S. Simon, West Newton, Mass.

[73] Assignee: Polaroid Corporation, Cambridge, Mass.

[22] Filed: Sept. 7, 1973

[21] Appl. No.: 395,255

[52] U.S. Cl. ......... 260/2 R, 260/2.2 R, 260/29.2 N, 260/13, 260/47 CP, 260/78 R, 260/79.3 R, 260/296 D
[51] Int. Cl. ...................... C08g 20/20, C08g 33/02
[58] Field of Search ..... 260/2.2 R, 13, 47 CP, 78 R, 260/78.4 R, 2 R, 79.3 R, 296 D

[56] References Cited
UNITED STATES PATENTS

| | | | |
|---|---|---|---|
| 3,274,161 | 9/1966 | Kramer et al. | 260/77.5 |
| 3,629,161 | 12/1971 | Paine | 260/2.1 E |
| 3,641,034 | 2/1972 | Simon | 260/296 R |
| 3,694,384 | 9/1972 | Factor et al. | 260/2.2 R |
| 3,697,528 | 10/1972 | Andrews et al. | 260/294.9 |

*Primary Examiner*—Melvin Goldstein
*Assistant Examiner*—E. A. Nielsen
*Attorney, Agent, or Firm*—Philip G. Kiely; Mart C. Matthews

[57] ABSTRACT

Novel polyviologen compounds useful in variable density light-filtering devices are provided which have repeating units (in oxidized dicationic form) represented by the formula:

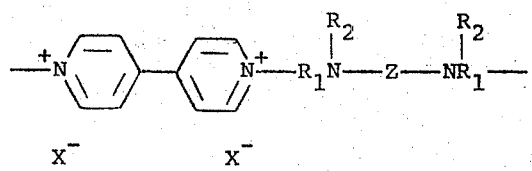

wherein $R_1$ is propylene or a straight-chain alkylene group having from six to 12 carbon atoms; $R_2$ is —H or a hydrocarbon group having from one to six carbon atoms; Z is a bivalent radical resulting from the removal of both active halogen atoms from an aromatic dihalide or from an aliphatic dicarboxylic acid dihalide having a straight four to eight carbon alkylene chain between terminal carboxylic acid halide groups; and X is an anion.

30 Claims, No Drawings

POLYVIOLOGENS

BACKGROUND OF THE INVENTION

1. Field of the Invention

This invention relates to novel bipyridinium compounds and, more particularly, to novel 4,4'-bipyridinium polymers which exhibit a reversible change in spectral absorption characteristics from their oxidized form to their first reduced form.

2. Description of the Prior Art

Various bipyridinium salts and polymers which undergo reversible oxidation-reduction (redox) changes in spectral absorption characteristics are known and described in the art.

The 4,4'-bipyridinium unit, commonly given the name "viologen," undergoes two separate one electron reduction steps as illustrated in the equation below:

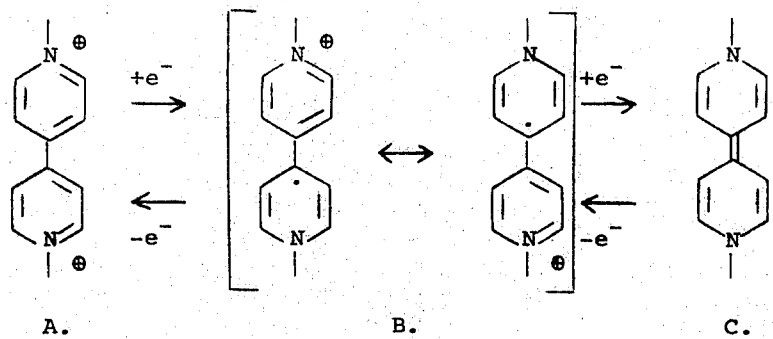

A.    B.    C.

Formula A represents the colorless oxidized dicationic form of the 4,4'-bipyridinium unit which upon the addition of one electron is reduced to a deep blue violet colored delocalized free radical-cation form B. The addition of another electron results in a complete reduction of the radical-cation to a neutral dihydrobipyridyl unit C. Both the B and C forms are rapidly oxidized by oxygen to the starting dicationic unit.

Viologen compounds have been widely used as photochemical or redox indicators in both the chemical and biochemical fields for many years. See, for example, Biochem. Biophys. Acta, 162 page 533 (1968). Polymers containing repeating viologen units, herein referred to as "polyviologens", have been previously described in the art, and specifically in several recent U.S. Patents, for example, Simon U.S. Pat. No. 3,641,034; Andrews et al. U.S. Pat. No. 3,671,250; and Factor et al. U.S. Pat. No. 3,694,384.

The polyviologens of the prior art are generally characterized as alkylation polymers, i.e., polymers prepared by polymerizing 4,4'-bipyridyl with a dihalide quaternizing agent, usually a dihaloalkane or a compound having an aromatic nucleus to which at least two haloalkyl substituents are attached. One deficiency of these alkylation polyviologens is their tendency to have low molecular weights and low viscosities, and therefore they do not possess good film-forming characteristics. Furthermore, the prior art polyviologens have free anions associated with the dicationic viologen unit.

It is therefore one object of this invention to provide novel redox polymers, i.e., novel polyviologens.

A further object is to provide novel polyviologens with good film-forming properties.

Still another object is to provide novel film-forming polyviologens, particularly "betaine polyviologens" with internal anions, which can be molecularly oriented and then cross-linked into water-insoluble films useful in the fabrication of light polarizers.

Still other objects of the invention will in part be obvious and will in part appear hereinafter.

SUMMARY OF THE INVENTION

The novel polyviologens of the present invention are readily prepared by a process of interfacial polycondensation wherein an aqueous solution of a diamino viologen salt is reacted with a solution of a dihalide compound in a waterimmiscible organic solvent in the presence of an acid acceptor compound. The resultant polymers exhibit the reversible redox color properties of the viologen unit and in addition are good film-formers. In preferred embodiments, films provided by these polyviologens can be cross-linked into water-insoluble films. Films may be obtained from the present polyviologens in the oxidized form (clear to lightly colored) or the reduced form (dark blue) of the polyviologen by concentrating an aqueous solution of the polyviologen to dryness. The color of the film as produced is in large part dependent upon what anion is associated with the dicationic viologen unit and these anions may be "simple" anions, polymeric anions or "internal" anions.

The materials of the present invention may be used in fabricating variable density light-filtering devices and when cast into films and molecularly oriented, they may be used as light polarizers.

For a fuller understanding of the nature and objects of the present invention, reference should be had to the following detailed description.

DETAILED DESCRIPTION OF THE INVENTION

In accordance with the present invention, novel polyviologens are provided which have repeating units (in oxidized dicationic form) represented by the following formula:

I.  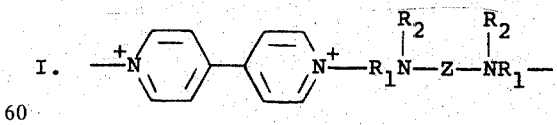

wherein $R_1$ is propylene or a straight-chain alkylene group having from six to 12 carbon atoms; $R_2$ is —H or a hydrocarbon group having from one to six carbon atoms; Z is a bivalent radical resulting from the removal of both active halogen atoms from an aromatic dihalide or from an aliphatic dicarboxylic acid dihalide having a straight four to eight carbon alkylene chain between terminal carboxylic acid halide groups; and X is an anion.

The selection of $R_2$ as either —H or a hydrocarbon group is a matter of choice for one practicing the invention. Accordingly, $R_2$ may be —H, alkyl, aryl, or cycloalkyl provided that the number of carbon atoms in the selected hydrocarbon group is from 1 to 6.

The anions which are in association with the bipyridinium cations, i.e., those groups represented by X in formula I, can be any of the simple anions, e.g., halide (i.e., chloride, bromide, fluoride and iodide), sulfate, nitrate, acetate, carbonate, azide, cyanide, etc., or may be a polymeric anion, e.g., carboxymethyl cellulose, cellulose sulfate or a polyanion of a cation exchange resin. As will hereinafter be discussed in more detail with specific examples, X can also be an "internal" anion which is permanently bonded to the polyviologen to form an internal salt or "betaine".

As discussed in more detail later, Z may contain substituents on the aromatic ring or aliphatic chain, including cyclic rings fused to the aromatic ring, and particularly, those substituents active in cross-linking condensation reactions or which provide internal anions. It is understood that the term "aromatic" denotes a compound or group containing a closed unsaturated ring which may be either carbocyclic or heterocyclic.

All formulae contained herein represent the oxidized dicationic form of the viologen compound, but it is understood that these compounds may also be reduced to take on a delocalized radical cation form as described above.

The polyviologens of the present invention are viscous, film-forming polymers, preferably having molecular weights in excess of about 10,000. Accordingly, the number of repeating units in formula I is sufficiently high to give a polymer capable of forming a film, i.e., a number in excess of two and preferably in excess of about ten.

The above-mentioned polyviologens are readily prepared by an interfacial polycondensation reaction between a novel water-soluble viologen salt of the formula:

II. 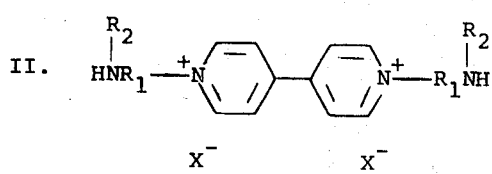

wherein $R_1$, $R_2$ and X have the definitions given previously, or its dihydrohalide salt, and a dihalide compound incorporating the Z moiety of formula I. (These novel salts and their preparation are the subject matter of copending application Ser. No. 395,254 filed on even date herewith and incorporated by reference herein.)

Those skilled in the polymer art are familiar with interfacial polycondensation as an extremely versatile method for synthesizing polymers based on the classical "Schotten-Bauman" reaction for acylating amines. These polycondensation reactions normally proceed rapidly at low temperatures, e.g., room temperature, and take place at the interface between a solution of a dihalide compound in a water-immiscible organic solvent and an aqueous solution of a diamino monomer such as those embraced by formula II to form reasonably high molecular weight polymers.

Exact stoichiometry of reactants is not as important in interfacial polycondensation as in other types of polycondensation reactions. The proper choice of a solvent system and reactant concentration ensures sufficient mobility of the growing chain and thus permits a high molecular weight to be reached. While the organic solvent chosen must be capable of preventing precipitation before high molecular weight has been attained, it need not dissolve the final polymer. The common organic solvents immiscible with water and inert to the reactive intermediate are quite satisfactory for the interfacial polycondensation reactions of the present invention. Chlorinated hydrocarbons and aromatic hydrocarbons are particularly useful.

Preferably, the polymer formed should be 5% or less on the basis of combined weights of water and organic solvent. At concentrations of 10% or higher, all of the liquid may be absorbed by the swollen polymer so that the mass cannot be stirred. This can lead to incomplete polymerization and low molecular weight. On the other hand, undesired hydrolysis of the acid dihalide may occur if polymerization is conducted in systems which are too dilute.

For a complete background on interfacial polymerization, its procedures and characteristics, reference may be made to *Journal of Polymer Science*, Vol. 40 (1959), particularly pages 289–327.

The viologen salts of formula II are, in general, prepared by quaternizing each of the tertiary amine groups of 4,4'-bipyridyl with a halide compound carrying a group which is reactive in the above-described condensation polymerization, i.e., a primary or secondary amine group.

Specifically, preferred water-soluble dihydrohalide viologen salts were prepared by a unique process which comprises reacting 4,4'-bipyridyl directly with the hydrohalide salt of an amino halide compound without "blocking" or "protecting" the active amine group through conventional means. The viologen salts which could be prepared by this method were limited to those in which the alkylene chain, $R_1$, comprised only 3, or 6 to 12 interlinear carbon atoms, i.e., those viologen salts represented by formula II. Details of the preparation of viologen salts within the scope of formula II are contained in the aforementioned copending application, which has been incorporated by reference into the present application.

As particular examples of monomers of formula II found suitable for the practice of this invention, mention may be made of the following compounds in which the optional hydrohalide molecules are indicated in parentheses:

III. 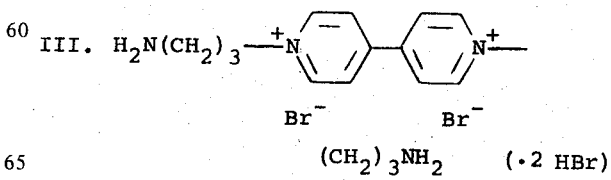

N,N'-bis-ɣ-aminopropyldipyridinium bromide (hydrobromide)

IV. 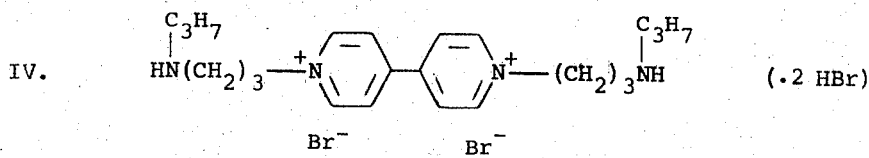  (·2 HBr)

N,N'-bis[N"-(n-propyl)-ɣ-aminopropyl]dipyridinium bromide (hydrobromide)

The reaction forming the polyviologens of the present invention comprises reacting an aqueous solution of a viologen salt of formula II with a solution of the dihalide compound in a water-immiscible organic solvent under interfacial polycondensation conditions. The dihalide compound may be represented by the formula:

Y—Z—Y  (V)

wherein Y is an active halide group, preferably chloride, and Z is the bivalent group remaining after the removal of both active halide groups, e.g., an aromatic dicarbonyl group, an aliphatic dicarbonyl group having a straight four to eight carbon alkylene chain between terminal carbonyl groups, a bivalent azine nucleus, etc.

The dihalide compound employed in the practice of this invention and providing the Z moiety shown in formula I may be any of a variety of known and available polyhalides wherein at least two of the halide atoms are "activated," e.g., by virtue of being attached through a carbonyl group or to the C atom of a —C=N— group, such as found in an azine nucleus. The terms "active" or "activated" are herein employed to denote sufficient reactivity of the halide atom to enter into a condensation reaction with the active hydrogens of the diamino viologen salt.

As examples of aromatic dihalides contemplated as suitable for providing the Z moiety of formula I, mention may be made of aromatic dicarbonyl chlorides, for example:

VI.  isophthaloyl chloride  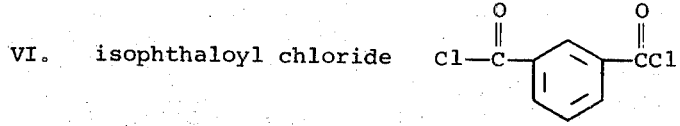

VII.  terephthaloyl chloride  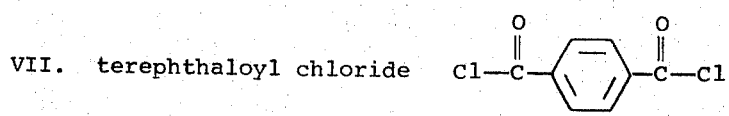

VIII.  pyromellityl chloride  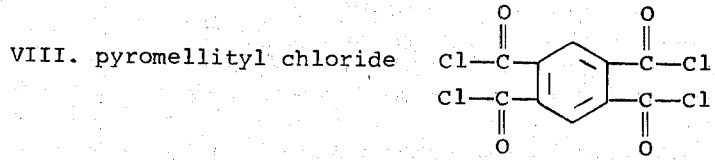

chloro-substituted triazines, for example:

IX.  cyanuric chloride  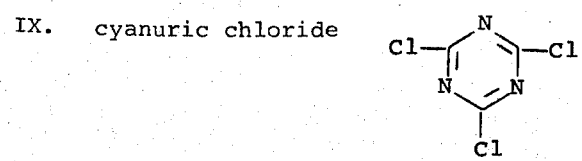

X.  2,6-dichloro-1,3,5-triazine  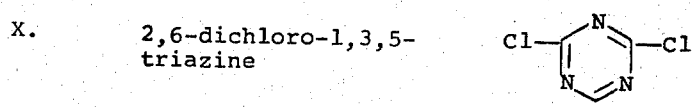

chloro-substituted pyrimidines, for example,

XI.  2,6-dichloropyrimidine  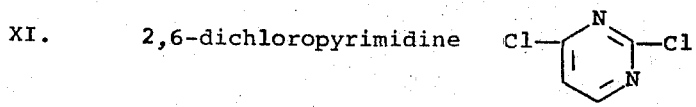

XII. 2,4,6-trichloropyrimidine 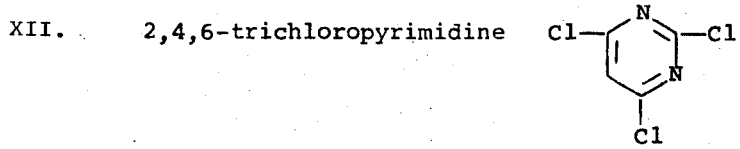

halo-substituted pyridazines, for example,

XIII. tetrafluoropyridazine 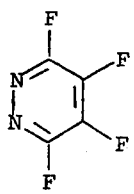

and combination compounds wherein one halide atom is bonded to an aromatic carbonyl group and at least another halide atom is bonded to an azine nucleus, for example:

XIV. 2,3-dichloroquinoxaline-6-carbonyl chloride 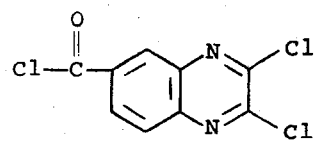

XV. 2,4-dichloropyrimidine-5-carbonyl chloride 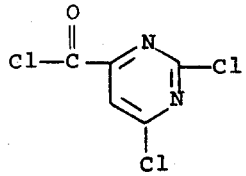

The dihalides of certain aliphatic dicarboxylic acids are also contemplated as being useful in the practice of this invention to provide the aforementioned Z moiety. The alkylene chain between the terminal carboxylic acid halide groups is preferably of sufficient length to substantially reduce hydrolysis of the dihalide by the aqueous phase and/or the formation of an imide with the diamino viologen monomer, i.e., the alkylene chain should be in excess of about four carbon atoms. As examples of aliphatic dicarboxylic acid dihalides contemplated as suitable for the practice of this invention, mention may be made of the straight-chain aliphatic dicarboxylic acid dihalides having from four to eight carbon atoms in the alkylene chain between terminal dicarboxylic acid halide groups such as, for example:

XVI. adipoyl chloride $ClC(CH_2)_4CCl$ (with =O on each C)

XVII. pimeloyl chloride $ClC(CH_2)_5CCl$

XVIII. suberoyl chloride $ClC(CH_2)_6CCl$

XIX. azelaoyl chloride $ClC(CH_2)_7CCl$

XX. sebacoyl chloride $ClC(CH_2)_8CCl$

As mentioned above, the interfacial polycondensation reaction takes place at the interface between the aqueous solution of the viologen salt of formula II and the solution of the dihalide compound of formula V in a water-immiscible organic solvent, preferably a dichlorinated lower alkane such as, for example, dichloroethane or dichloromethane. An acid acceptor compound should be present in the reaction mixture to consume the acid generated by the condensation reaction, and also to remove the hydrohalide molecules from the amino groups of the viologen salt if the hydrohalide form of the salt is employed. Weak bases, such as alkali metal carbonate or bicarbonate solutions are suitable as acid acceptors and are usually included in the aqueous solution of the viologen monomer. For example, four equivalents of $Na_2CO_3$ per equivalent of the viologen salt may be advantageously included in the aqueous viologen salt solution prior to the addition of the dihalide compound solution thereto.

The reaction normally proceeds satisfactorily at room temperature, i.e., about 25° C., however, the reaction may be carried out at other temperatures and the sequence of addition of reactants may be varied, depending on the particular dihalide compound employed and the product desired.

The above-described preparation of the polyviologens of this invention will be further illustrated by the following detailed example which is not intended to limit the scope of the invention but merely to illustrate it.

EXAMPLE I

An aqueous solution of 0.004 mole of N,N'-bis-γ-aminopropyl dipyridinium bromide hydrobromide in 70 ml. of water was placed in a small blender jar and a solution of 0.0044 mole of isophthaloyl chloride dissolved in 20 ml. of dichloroethane was added, followed by 0.008 mole of solid sodium carbonate. The mixture was stirred at high speed for 15 minutes. The reaction mixture was then heated to dispel dichloroethane and the water-soluble polymer was precipitated with acetone. The product was dried for about 4 hours at 70°C. and 0.4 mm pressure whereupon it turned green-blue in color. When the polymer was left to stand overnight in the air at atmospheric pressure, the color changed to yellow. A molar extinction coefficient of 22,800 at $\lambda_{max}$ of 255 nm was obtained in water. The NMR spectrum in $D_2O$ showed 4.6 protons assignable to residual acetone (corresponding to 0.77 moles thereof), as well as residual water. An elemental analysis for C, H and N compared with the calculated theoretical values (which included 0.77 molecule of acetone and 2 molecules of water) as follows:

|  | % of Element in Compound | | |
|---|---|---|---|
|  | C | H | N |
| Calculated | 51.9 | 5.8 | 9.3 |
| Found | 51.4 | 5.8 | 9.5 |

NMR spectra were consistent with a polymeric structure having repeating units of the formula:

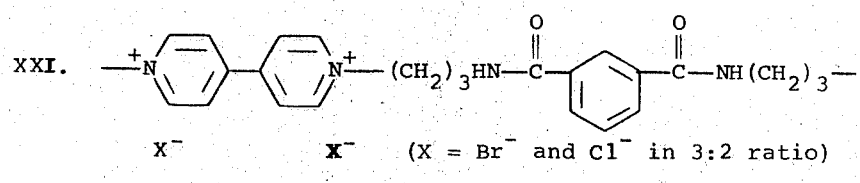

Poly(N,N'-propylene-4,4'-dipyridinium chlorobromide) isophthalamide

The above polyviologen was soluble in water and formed a yellow to amber-orange film when an aqueous solution was concentrated to dryness on a glass surface at room temperature and about 1 to 2 mm pressure. This film was photochromic and turned greenish-blue due to the formation of the radical cation form when exposed to a sunlamp (e.g., a Westinghouse RS 275 watt sunlamp) at a distance of about 6 inches for 10 minutes. The dark film faded slowly back to a yellowish clear film after standing in the air for about 8 hours in a darkened room. Wetting the dark film in air with water decolorized it rapidly (i.e., in about one minute).

The procedure of Example I was essentially repeated employing an aliphatic dicarboxylic acid dihalide, sebacoyl chloride (compound XX above) instead of isophthaloyl chloride. A yellow water-soluble solid was produced which formed an opaque yellow film when an aqueous solution was concentrated to dryness. The film showed the characteristic viologen color change upon reduction by producing a slightly blue color in an aqueous solution of $S_2O_4^{--}$ and a deep purple color in an aqueous solution of $CO_3^{--}$.

The free anion associated with the polyviologen may be readily changed and it was found that the properties of the polyviologen were quite dependent upon what anions were present. To illustrate this point, the chloride of the polyviologen produced in Example I was prepared by treating an aqueous solution of the bromide (i.e., the compound of formula XXI having all $Br^-$ anions) with an excess $Ag_2CO_3$ in dim light. The AgBr which precipitated was removed by filtration. The aqueous filtrate was then acidified to a pH of 3 with aqueous HCl and concentrated in vacuo and at room temperature in a polyethylene container to yield a water-soluble amber solid. When the product was dissolved in water and the aqueous solution concentrated to dryness on a glass plate, a lightly yellow colored film was produced which turned blue more readily than the bromide when exposed to the sunlamp. This blue color faded slowly after standing in a darkened room overnight and reappeared upon exposure to the sunlamp.

However, in contrast to the above polyviologens, when the fluoride was prepared from the polyviologen bromide of formula XXI by employing the same procedure as described above except with HF, a dark blue-green colored paramagnetic solid was obtained without exposure to the sunlamp. This solid dissolved readily in water (in the presence of air) to provide an almost colorless solution. The dark blue film obtained by concentrating this aqueous solution to dryness at room temperature and 1 to 2 mm pressure gave a very strong electron-spin resonance (ESR) signal, thereby indicating the presence of the large number of unpaired electrons which would be expected from repeating units of the radical cation form of the viologen unit. The dark purple-blue to blue-green color of the film did not appear to fade in dry air or under a sunlamp, but was readily discharged upon dissolution of the film in water in the presence of air.

Other anions associated with the polyviologen XXI were found to produce dark concentrates with properties similar to the fluoride. These anions included acetate, carbonate, cyanide and azide. The acetate was obtained directly by treatment of the bromide solution with AgOAC. To provide the other anions, the bromide solution was heated with the Na or K salt of these anions and the mixture was concentrated. Although the bromide ion (as well as the Na or K ion) were still present, this technique gave a convenient way to screen anions quickly. For each anion which gave a dark colored film upon drying at room temperature under reduced pressure, a similar dark concentrate could be quickly obtained at atmospheric pressure in an oven heated to about 140° C. When aqueous solutions of the polyviologens which gave these dark colored films were spotted on ordinary filter paper, deep blue spots were obtained. Drying in air was sufficient to readily form a blue spot for the fluoride, acetate and carbonate. With the chloride solution, however, even heating in an oven at 140° C. (which accelerates the blue spot formation with the anions just mentioned) produced only a yellowish spot. However, as previously described, exposure to a sunlamp rapidly changed this yellow spot to blue, and the blue spot faded slowly (overnight) back to yellow in a darkened room. The yellow spot was easily changed again to blue by another exposure from the sunlamp.

The formation of the colored radical-containing films may be prevented or "quenched" by adding to the polymer those anions which do not form dark films without exposure to light, e.g., $Br^-$, $Cl^-$, $I^-$ and $NO_3^-$. As was earlier mentioned, the light-colored polyviologen films containing these quenching anions could be encouraged to form the blue-colored radical-containing films by exposure to bright light from a sunlamp. It was also found that the ease of this radical formation was the inverse of a particular anions's ability to be oxidized or serve as a "quencher." It appears from these observations that the spontaneous formation, i.e., at room temperature without light, of a dark colored film requires a "basic" anion (i.e., as basic or more basic than the fluoride ion) to be present and that easily oxidizable anions known to be effective quenchers, e.g., $Br^-$, $Cl^-$, $I^-$, etc., should be absent or in low concentration.

Polymeric anions of suitable basicity and film-forming ability may also be employed with the polyviologens of this invention and thus X in formula I may also represent a polymeric anion. For example, the polymer of formula XXI was reacted with sodium carboxymethyl cellulose, followed by dialysis, to form the insoluble polycation-polyanion complex. This product could be cast into a white opaque film from a mixture of pyridine, water and sodium bromide, and the film could then be made transparent (gelatinous) by extracting out the sodium and bromide ions. The transparent film converted to the colored species upon standing (drying) in air in a dimly lighted room indicating that it was of the "dark film" classification. Also included in the term "polymeric anions" as used herein are the polyanions of cation exchange resins such as, for example, polystyrene sulfonic acids, polyethylene sulfonic acids or polycarboxylic acids.

As demonstrated above, it is possible to drastically alter the properties of the polyviologen merely by changing the anion. In some instances it may be desirable to ensure that the anion cannot be changed. An internally neutralized salt or "betaine" form of the polyviologen achieves this purpose since the internal anions of this form are permanently attached and therefore are unchangeable. As previously mentioned, X in formula I may also represent such an internal anion.

The internal anions of the betaine form are preferably provided by ring substituents on the aromatic nucleus of an aromatic dihalide, although suitable substituents may be included on the alkylene chain of the abovedescribed dicarboxylic acid dihalides or on the viologen salt. By way of illustration, pyromellityl chloride was reacted with the viologen salts of formulae III and IV to provide betaine polyviologens within the scope of this invention.

It should be noted that the use of a tetra-acid halide such as pyromellityl chloride with a diamino monomer would usually be avoided in polymerization reactions unless a highly cross-linked product was desired. Not surprisingly, the normal conditions for interfacial polymerization gave low yields of the desired linear polyviologen. However, as will be discussed later in connection with similar reactions involving reagents with cross-linkable substituents, it was found that certain modifications could be made to the normal conditions of interfacial polycondensation in order to maximize the yield of the desired product. Thus, it was found that by reversing the addition sequence, i.e., gradually adding the viologen monomer and $Na_2CO_3$ solution to the stirred solution of the pyromellityl chloride, a yield of about 57% of the desired polyviologen could be obtained while reducing the yield of insoluble cross-linked by-product to about 9% (from about 44% for the normal conditions).

The following examples detail the formation of these polyviologen betaines and are intended to illustrate the invention further without limiting it in any way.

EXAMPLE II

A solution of 1 equivalent of N,N'-bis-γ-aminopropyl-dipyridinium bromide hydrobromide and four equivalents of $K_2CO_3$ in water was added gradually over ten minutes to a stirred solution of 1 equivalent of pyromellityl chloride in 1,2-dichloroethane. The polymer was precipitated from a $H_2O$/ethanol mixture and then dialyzed for about one week to remove inorganic salts. The blue glassy water-soluble product had a molar extinction coefficient in water of 26,900 at $\lambda_{max}$ of 256 nm. Visible and ESR spectra showed the color to be due to the viologen radical, and the formation of this radical was found to be quenched by the addition of one equivalent of NaBr. Two elemental analyses on the same sample compared with the calculated theoretical value (including 0.2 moles of $KHCO_3$ and 3 moles of water as determined by thermal gravimetric analysis) as follows:

|  |  | % of Element in Compound | | | | |
| --- | --- | --- | --- | --- | --- | --- |
|  |  | C | H | N | Cl,Br | $H_2O$ |
| Calculated |  | 57.56 | 5.57 | 10.33 | 0.0 | 9.95 |
| Found | No. 1 | 57.16 | 5.79 | 9.78 | 0.0 | 9.6 |
|  | No. 2 | 57.32 | 5.80 | 9.81 | — | — |

NMR spectra were consistent with a betaine polymer having repeating units of the formula:

XXIII. 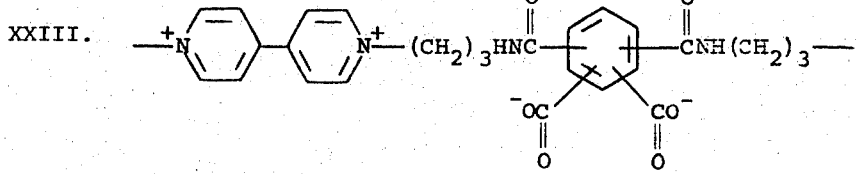

Poly(N,N'-propylene-4,4'-dipyridinium)pryomellitamic betaine

It appeared from NMR spectra that a 1:1 mix of two forms of the polymer had been produced, i.e.,

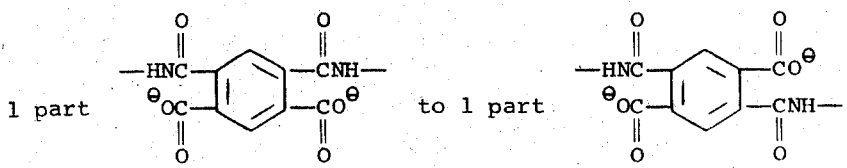

1 part     Form A     to 1 part     Form B

Heating of this polyviologen above 85° C. resulted in the formation of imide groups, sharply changing the properties of the polymer. It was necessary, therefore, that films prepared by concentrating aqueous solutions of this polyviologen to dryness be heated to temperatures no higher than 85° C.

It was found that this imide formation could be avoided by employing a viologen salt having secondary amino groups, such as illustrated by the following non-limiting example:

EXAMPLE III

The procedure of Example II was followed except that a secondary amine viologen monomer, N,N'-bis[N''-(n-propyl)-γ-aminopropyl]dipyridinium bromide hydrobromide was employed. A water-soluble polyviologen betaine was obtained, with a molar extinction coefficient in water of 26,800 at $\lambda_{max}$ of 255 nm. Two elemental analyses for C, H and N on the same sample compared with the calculated theoretical values (including 2¼ moles of water as determined by thermal gravimetric analysis) as follows:

|  |  | % of Element in Compound |  |  |
|---|---|---|---|---|
|  |  | C | H | N |
| Calculated |  | 62.6 | 6.66 | 9.13 |
| Found | No. 1 | 62.1 | 6.72 | 9.4 |
|  | No. 2 | 62.2 | 6.60 | 9.5 |

NMR spectra confirmed a polymeric structure having repeating units of the formula:

described conversion of amide to imide groups when heated up to about 125° C.

The above polyviologen betaines belong to the "dark film-forming" class described above and, therefore, formed dark blue, thermochromic and photochromic films when their aqueous solutions were concentrated to dryness at room temperature and low pressure (1 to 2 mm) in the absence of light. IR, UV and elemental analyses of these betaines showed them to be substantially lacking any free anion when fully neutralized. Concentration of aqueous solutions of the polyviologen betaines made acidic to a pH of about 3 with HBr, HCl, $HNO_3$ and $H_2SO_4$ yielded photo- and thermochromic films similar to those obtained from neutral solution.

While the polyviologens of the present invention are insoluble in most organic solvents, they are soluble or at least swollen in water. As described in the above examples, films may be prepared by dissolving the polyviologen in water to obtain a solution containing, for example, 25% of the polyviologen, and thereafter casting the solution on a smooth surface, such as a glass plate. The polyviologen may be incorporated in or on other suitable substrates such as paper or other sheet materials, e.g., polymeric sheet materials.

Films may also be made of the above-described polyviologens by mixing them with water-soluble bodying polymers, for example, polyvinyl alcohol, gelatin, an alginate, a maleic anhydride copolymer or polyvinylpyrrolidone. The films thus-prepared may be used as light-filtering layers in a light filter, and when molecularly oriented, they may be used as light polarizers. The films are conveniently oriented by rubbing them in one XXIV. 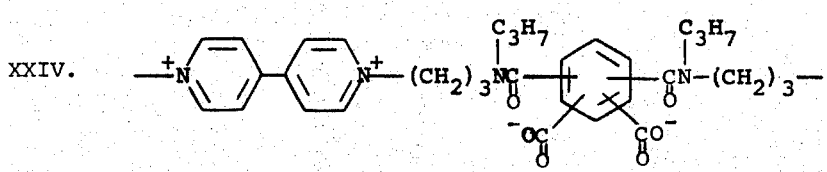

Poly(N,N'-propylene-4,4'-dipyridinium)N'',N'''-<u>n</u>-propyl pyromellitamic betaine This polyviologen produced a brittle blue colored film when cast from water and did not show the abovedirection with polished wood or a polished steel burnishing tool until they are clear.

Rendering the polyviologen film water-insoluble subsequent to its formation is often desirable, for example, when swelling of the film by water would disrupt its molecular orientation and, therefore, destroy its effectiveness as a light polarizer. One extremely useful technique for forming water-insoluble films in accordance with this invention is to provide an appendage substituent on the polyviologen which is available subsequent to the formation of the film to enter into a condensation reaction with another reagent and thereby cross-link the polyviologen. Substituents remaining on an aromatic nucleus of the dihalide compound after polymerization have been found to be convenient sources of these cross-linking substituents in the resultant polyviologen, i.e., the cross-linking group may be a substituent attached to the Z moiety of formula I. As examples of cross-linking substituents which are contemplated as suitable for this aspect of the invention, mention may be made of those groups which are known to be reactive in cross-linking condensation reactions such as, for example, halide (e.g., —Cl, —Br, —F), —OH, —SH, —COOH, —SO$_2$OH, —CH$_2$CH$_2$OH, —C$_6$H$_5$CH=CHCOOH, etc.

It will be apparent to those skilled in the art that reactants having cross-linkable groups are likely to form cross-linked products during the polymerization step, thus lowering the yield of the desired linear product. Cross-linking reactions during the polymerization step may be avoided in various ways such as, for example, by "blocking" the reactive group in a known manner wherein the reactive group is converted to a group which is non-reactive during polymerization, but is reconverted to the reactive group after the polyviologen is formed. However, it has been found in several instances that simply by making appropriate modifications to the normal interfacial polycondensation reaction conditions so as to depress the reactivity of the cross-linking substituent, the polymerization is allowed to proceed with a minimum of undesirable cross-linking. As an illustrative example, cyanuric chloride was polymerized with the viologen hydrobromide salt of formula III using the normal interfacial polymerization conditions, i.e., at room temperature and with the addition of two equivalents of Na$_2$CO$_3$ per amine . HBr unit (or four equivalents of Na$_2$CO$_3$ per diamino viologen unit) to the aqueous solution of the viologen salt prior to the addition of the cyanuric chloride in organic solvent. The major product of this reaction (about 50% of the yield) was very water-insoluble and thought to be cross-linked. However, by lowering the reaction temperature to about 15° C. and maintaining the pH of the reaction mixture near 7.0 by gradual addition of the Na$_2$CO$_3$ — conditions which lowered the active amine concentration and depressed the reactivity of the third chloride group of cyanuric chloride — the cross-linked product could be minimized (to about 26% of the yield) and the yield of the desired linear polyviologen increased (from about 20% to about 64%). This procedure is detailed in the following non-limiting example:

EXAMPLE IV 11.90 g. (20 m moles) of N,N'-bis-γ-aminopropyl dipyridinium bromide hydrobromide was added to a 1 liter flask equipped with a thermometer and pH probe. 250 cc. of distilled water was then added to produce a clear yellow solution having a pH of about 2. Then, 2.12 g. (50 m moles) of Na$_2$CO$_3$ and 100 cc. of distilled water were added to the solution, which was then stirred and cooled in an ice bath for about 10 minutes reaching a temperature of 12° C. and a pH of 8.2. A solution of 4.055 g. (22 m moles) of cyanuric chloride in 160 cc. of dichloroethane was slowly added over the space of about 5 minutes to the water solution after 75 cc. of dichloroethane had been added, and then 80 cc. of dichloroethane which was employed to wash the beaker containing the cyanuric chloride was also added. The pH of the resultant mixture dropped to 6.8, with the temperature remaining at 12° C. the pH was maintained at about 7.1 to 7.2 by gradually adding a solution of 2.12 g. of Na$_2$CO$_3$ in 40 cc. of distilled water over about 10 minutes with stirring. The stirring was continued with the temperature at about 15.5° and pH at 6.6–7 for about 30 minutes, and thereafter the temperature was allowed to rise to 36° C. over about one hour with an accompanying decrease in pH to about 5.5. The mixture was then cooled to about 13° C., and the pH was maintained at 6.8–7.2 for another hour by gradually adding a solution of 20 g. of Na$_2$CO$_3$ in 40 cc. of water with stirring. The pH of the mixture was then adjusted to 4.0 with HBr, and the upper aqueous phase was separated from the mixture. A green-yellow solid was precipitated from the aqueous phase with acetone, collected on a filter, washed in acetone and dried in a vacuum dessicator to yield about 6.9 g. (64% yield). An ion exchange column containing bromide ion was used to ensure that all of the free anion was bromide. The water-soluble powder gave a molar extinction coefficient in water of 23,800 at $\lambda_{max}$ of 260 nm. Two elemental analyses for C, H and N on the same sample compared with the calculated theoretical values as follows:

|  |  | % of Element in Compound | | | | |
| --- | --- | --- | --- | --- | --- | --- |
|  |  | C | H | N | Cl | Br |
| Calculated |  | 39.6 | 4.52 | 16.9 | 6.1 | 27.3 |
| Found | No. 1 | 39.4 | 4.4 | 17.0 | 6.1 | 27.3 |
|  | No. 2 | 39.2 | 4.3 | 17.2 | 6.1 | 27.6 |

UV, IR and NMR spectra were consistent with a polymer having repeating units of the structure:

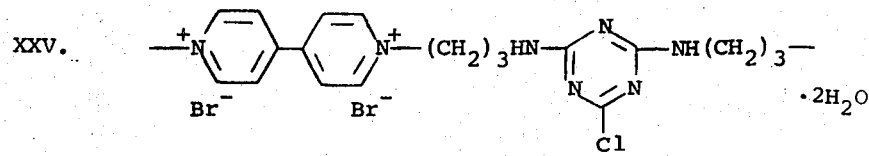

XXV.

Poly-2,4-di[ χ-(4',4"-dipyridinium dibromide) propylamino]-6-chloro-s-triazine

Concentrating an aqueous solution of the above polyviologen to dryness at room temperature and 1 to 2 mm pressure yielded a clear film which was photochromic and turned blue upon exposure to a sunlamp. An ion exchange column was used to prepare the corresponding chloride polyviologen from the bromide and films obtained from this chloride polyviologen formed deeper blue films under the sunlamp more readily than did the bromide polyviologen.

Cross-linking of the above-described polyviologen was achieved by treatment of the cast film with a dilute solution of 1,5-diaminopentane in ethanol at about 50° C. The water-solubility of the film was significantly decreased by this treatment.

It is possible in accordance with this invention to obtain a water-soluble polyviologen in betaine form which can also be cross-linked into a water-insoluble film. These cross-linkable polyviologen betaines may be produced by providing both cross-linking and internal anion-providing substituents in the polyviologen. This result may be accomplished, for example, by copolymerizing a viologen monomer of formula II with compounds carrying functional groups from which both the internal anions and cross-linkable groups are obtained. The following non-limiting example illustrates the preparation of a cross-linkable polyviologen betaine copolymer within the scope of this invention:

EXAMPLE V

A solution of 4 equivalents of N,N'-bis-γ-aminopropyl dipyridinium bromide hydrobromide and 15 equivalents of $K_2CO_3$ in water was added gradually over about 20 minutes to a stirred solution of 3 equivalents of pyromellityl chloride and 1 equivalent of cyanuric chloride in 1,2-dichloroethane at about 5°–10° C. to minimize cross-linking. Stirring was continued over the next 15 minutes while 7 equivalents of $K_2CO_3$ were added and the temperature was allowed to reach about 15° C. The polymer was precipitated with acetone from the aqueous phase after the pH was adjusted to 4.5 with HBr. An ion exchange column (Cl⁻) was used to change those free ions present to chloride. The polymer was a glassy solid upon room temperature concentration at 1 mm. pressure. The color was amber or blue depending on the amount of water present and exposure to light. The molar extinction coefficient in water was 28,500 at $\lambda_{max}$ of 256 nm. Although varying hydration and ash values made elemental analysis quite complex, IR, UV and NMR spectra were consistent with a copolymer structure with had 3 repeating units of the formula:

A film of the above water-soluble copolymer was cast on glass from a water solution and was cross-linked by keeping the copolymer at 30° C. for 2 hours in a 10:1 ethanol-water mixture containing a low concentration of 1,5-diaminopentane. The initially clear film became insoluble in water when cross-linked as just described, and in this cross-linked state could be reduced to the purple viologen radical by immersing the film in an aqueous solution containing $S_2O_4^{--}$ and $CO_3^{--}$. The colored film was reoxidized to a clear film by air in about one minute and this redox behavior was exhibited repeatedly.

The properties of the polyviologens of this invention make then particularly useful in variable density light filtering devices and applications, for example, as described in Rogers U.S. Pat. No. 3,652,149 issued Mar. 28, 1972 and Hall et al U.S. Pat. No. 3,692,388 issued Sept. 19, 1972, which patents are herein incorporated by reference to fully describe the utility of the subject polyviologens. They mal also be used as (short wavelength) radiation detectors which are also protective in the colored state. Films obtained from polyviologens of this invention thus may be put to a variety of uses, particularly when incorporated in selfadjusting light filters, e.g., in sunglasses, windows, etc.

Those films with high ESR signals may also serve as polyradicals in several applications, for example, as semiconducting (or conducting) films, polymerization catalysts, etc.

Since certain changes may be made in the above products and processes without departing from the scope of the invention herein involved, it is intended that the above description and examples shall be interpreted as illustrative and not in a limiting sense.

What is claimed is:

1. A polymer having in its structure repeating units of the formula:

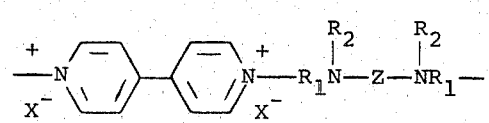

wherein $R_1$ is propylene or a straight-chain alkylene group having from six to 12 carbon atoms in the chain; $R_2$ is —H or a hydrocarbon group having from one to six carbon atoms; Z is a bivalent radical resulting from the removal of both active halide atoms from an aromatic dihalide wherein said halide atoms are activated by virtue of being attached to the aromatic nucleus

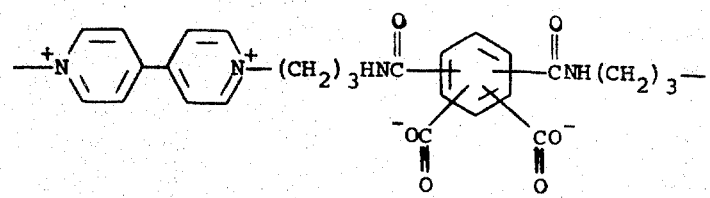

for each repeating unit of the formula:

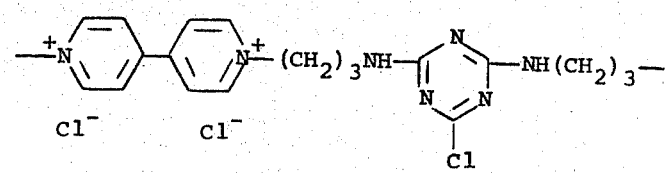

through a carbonyl group or by being directly attached to the carbon atom of a —C=N— group in the aromatic nucleus; or from an aliphatic dicarboxylic acid dihalide having a straight 4 to 8 carbon alkylene chain between terminal dicarboxylic acid halide groups; and X is an anion.

2. A polymer as defined in claim 1 which is film-forming.

3. A polymer as defined in claim 2 having a molecular weight in excess of about 10,000.

4. A polymer as defined in claim 2 having an appendage substituent which is available subsequent to the formation of said film to enter into a condensation reaction with another reagent and thereby cross-link said polymer into a water-insoluble film.

5. A polymer as defined in claim 4 wherein said cross-linking substituent is a substituent on the aromatic nucleus of Z.

6. A polymer as defined in claim 5 wherein said nuclear cross-linking substituent is selected from the group consisting of halide, —OH, —SH, —COOH, —SO₂OH, —CH₂CH₂OH, and —C₆H₅CH=CHCOOH.

7. A polymer as defined in claim 1 wherein R₂ is alkyl or aryl.

8. A polymer as defined in claim 1 wherein X is a simple anion selected from the group consisting of halide, sulfate, nitrate, acetate, carbonate, azide and cyanide.

9. A polymer as defined in claim 1 wherein X is a polymeric anion.

10. A polymer as defined in claim 9 wherein said polymeric anion is the polyanion of a cation exchange resin.

11. A polymer as defined in claim 9 wherein said polymeric anion is the polyanion of sodium carboxymethyl cellulose.

12. A polymer as defined in claim 1 wherein X is an internal anion and said polymer is an internal salt.

13. A polymer as defined in claim 12 wherein said internal anion is attached to the aromatic nucleus of Z.

14. A polymer as defined in claim 1 wherein Z is an carbocyclic dicarbonyl group, an aliphatic dicarbonyl group having a straight four to eight carbon alkylene chain between terminal carbonyl groups, a bivalent azine nucleus or a bivalent group having one bond to an azine nucleus and the other bond to an carbocyclic carbonyl group.

15. A polymer as defined in claim 1 wherein Z is:

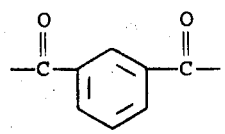

16. A polymer as defined in claim 1 wherein Z is:

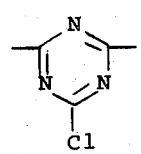

17. A polymer as defined in claim 1 comprising repeating units of the formula:

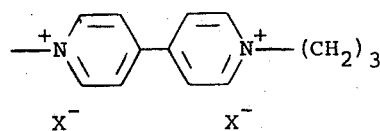

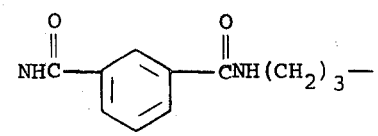

wherein X is Br⁻, F⁻, Cl⁻, CN⁻, OAC⁻, CO₃⁻⁻, NO₃⁻, SO₄⁻⁻ or N₃⁻.

18. A polymer as defined in claim 1 comprising repeating units of the formula:

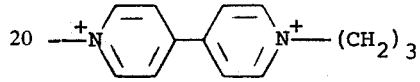

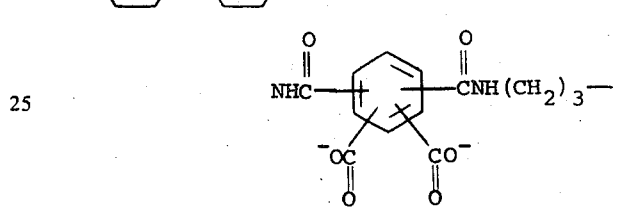

19. A polymer as defined in claim 1 comprising repeating units of the formula:

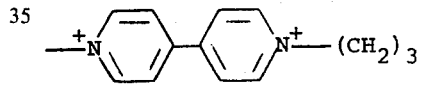

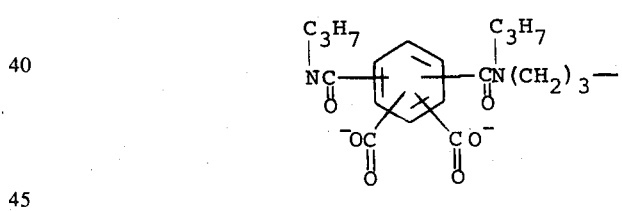

20. A polymer as defined in claim 1 comprising repeating units of the formula:

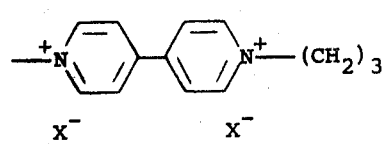

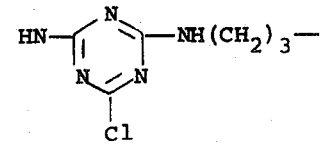

wherein X is Br⁻ or Cl⁻.

21. A polymer as defined in claim 20 which is cross-linked with an aliphatic diamine.

22. A copolymer comprising repeating units of the formulae:

A. 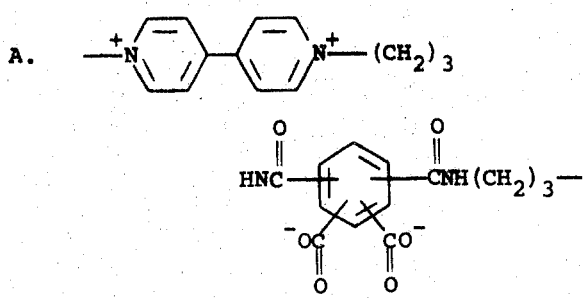

and

B. 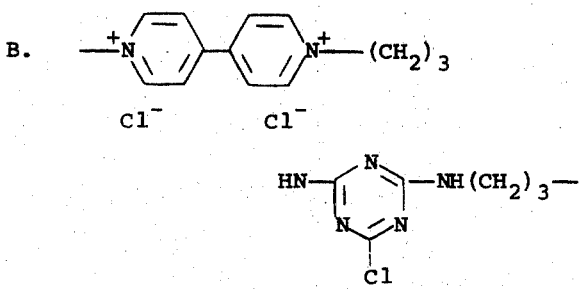

23. A copolymer as defined in claim 22 wherein the ratio of A units to B units is 3 to 1.

24. A copolymer as defined in claim 23 which is cross-linked with an aliphatic diamine.

25. A polymer as defined in claim 1 which is water-soluble.

26. A water-insoluble cross-linked polymer having in its structure repeating units of the formula:

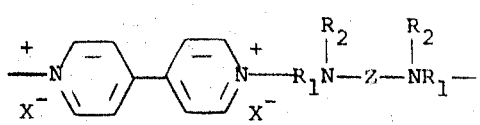

wherein $R_1$ is propylene or a straight-chain alkylene group having from six to 12 carbon atoms in the chain; $R_2$ is —H or a hydrocarbon group having from one to six carbon atoms; Z is a bivalent radical resulting from the removal of both active halide atoms from an aromatic dihalide wherein said halide atoms are activated by virtue of being attached to the aromatic nucleus through a carbonyl group or by being directly attached to the carbon atom of a —C=N— group in the aromatic nucleus; or from an aliphatic dicarboxylic acid dihalide having a straight four to eight carbon alkylene chain between terminal dicarboxylic acid halide groups; and X is an anion; said polymer being cross-linked through an appendage cross-linking substituent.

27. A cross-linked polymer as defined in claim 26 wherein Z is a carbocyclic dicarbonyl group, an aliphatic dicarbonyl group having a straight four to eight carbon alkylene chain between terminal carbonyl groups, a bivalent azine nucleus or a bivalent group having one bond to an azine nucleus and the other bond to a carbocyclic carbonyl group.

28. A cross-linked polymer as defined in claim 26 wherein said cross-linking substituent is attached to the aromatic nucleus of Z.

29. A cross-linked polymer as defined in claim 28 wherein said cross-linking substituent is selected from the group consisting of halide, —OH, —SH, —COOH, —SO$_2$OH, —CH$_2$CH$_2$OH and —C$_6$H$_5$CH=CHCOOH.

30. A cross-linked polymer as defined in claim 26 wherein said polymer is cross-linked with an aliphatic diamine.

* * * * *